United States Patent

[11] 3,522,832

[72] Inventors: Ludwig Held
 168 Traubenweg,
 Darmstadt 61, Germany;
 Eickhard Goebel
 19 Eschollbrucker Str.,
 Darmstadt 61, Germany
[21] Application No.: 679,727
[22] Filed: Nov. 1, 1967
[45] Patented: Aug. 4, 1970

[54] TIRE MOUNTING AND DEMOUNTING MACHINE
 3 Claims, Drawing Figs.
[52] U.S. Cl. .................................................. 157/1.22
[51] Int. Cl. ................................................ B60c 25/08
[50] Field of Search ....................................... 157/1.17,
 1.2, 1.22, 1.24, 1.26, 1.28

[56] References Cited
 UNITED STATES PATENTS
 2,163,469 6/1939 Raschka ..................... 157/WHDig.UX
 2,569,789 10/1951 Weaver ..................... 157/1.22UX
 3,064,718 11/1962 Brosene, Jr. .................. 157/1.28
 3,104,695 9/1963 McKinney ..................... 157/1.22
 3,244,218 4/1966 Rexroat ....................... 157/1.28

Primary Examiner—Granville Y. Custer, Jr.
Attorneys—Cushman, Darby and Cushman

ABSTRACT: Tire mounting and demounting apparatus is provided in which tires with rims of varying diameter are locked on a power-actuated stepped chuck, the interior of the chuck being sealed against dirt and other foreign matter by a plate or cover member. When demounting a tire, the tire beads are broken by a pair of spring balanced breaker shoes which are articulately connected to, and actuated by, a common pneumatic cylinder. A stop acts in association with the upper breaker shoe and ensures proper seating of the breaker shoes in the drop center well of the rim. A tire bead rolling-off tool consisting of a pair of oppositely rotating rollers rolls off the bead while protecting the tire rim against deforming forces. When mounting a tire a bead rolling-in tool, consisting of a plurality of cooperating rollers, mounts the bead without subjecting the rim to distorting forces. The foregoing abstract is not intended to define the scope of the invention and is only provided to permit a cursory review of the gist of the invention.

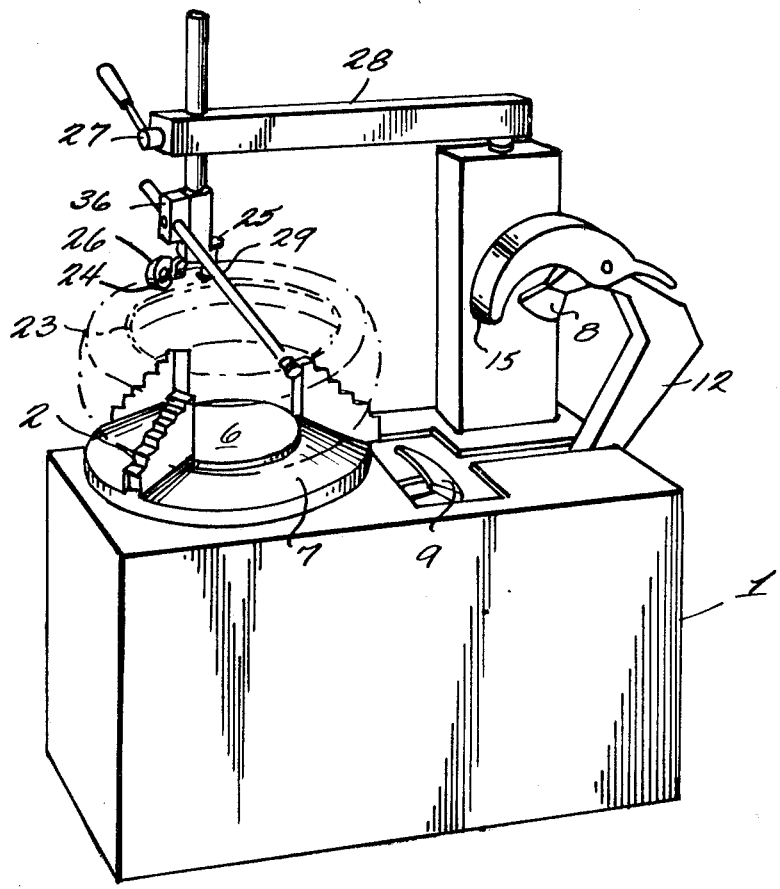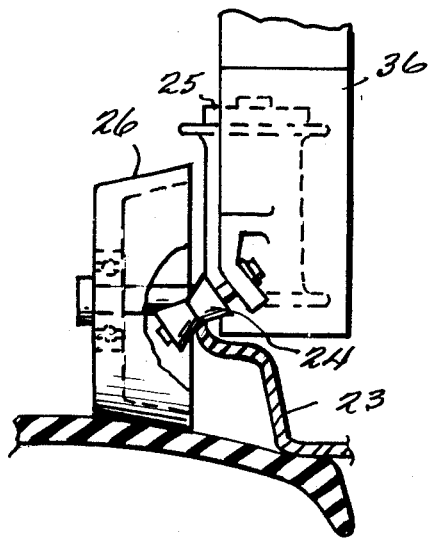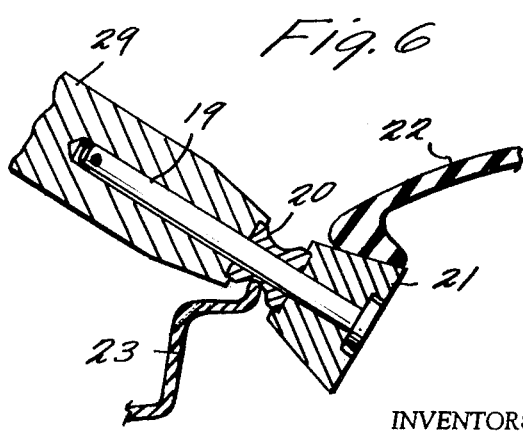

INVENTORS
LUDWIG HELD
EICKHART GOEBEL

BY Cushman, Darby & Cushman
ATTORNEYS

Patented Aug. 4, 1970

INVENTORS
LUDWIG HELD
EICKHART GOEBEL

BY Cushman, Darby & Cushman
ATTORNEYS

U.S. PATENT 3,522,832
TIRE MOUNTING AND DEMOUNTING MACHINE

BRIEF DESCRIPTION OF THE INVENTION

The invention relates to a tire mounting and demounting machine including a device for mounting a motor vehicle wheel, devices for rolling in and off the beads of a tire and a breaking device consisting of a pair of the cooperating breaker shoes for pressing the tire beads into the drop center well of the wheel rim.

In order to achieve easier mounting and demounting of automobile tire wheels on rims, machines have recently come into use which essentially consist of a clamping device for the rim, a device for breaking the beads and a device for rolling the tire beads in and off. Accordingly, tire mounting and demounting machines are known which are suitable for handling wheels with, as well as without, center hub openings; the breaking of the beads and pressing in of the tire into its drop center well, however, must be done before locking the rim, since the breaking operation is not possible while the rim is in a locked condition. Of course, there are tire mounting and demounting machines on which the tire can be broken with the rim locked. However, the use of rims without center hub openings is not possible in this instance as the chucking device is provided with a center post which serves to roll the tire beads in and off.

Another disadvantage of known machines is to be found in the fact that before locking rims which have greatly varying diameters, the chucking device must be set for the particular rim size to be handled. On other embodiments the rim chucking devices do not fully cover the necessary service range from 10" to 18" diameter, or they require an exchange of the chucking elements when the lower or upper limit of the chucking range is reached. Further embodiments are provided with chucking levers which operate by swivel motions around fixed fulcrums and consequently produce widely differing chucking forces, depending upon the particular design. Because of the extreme length of adjustment paths, other embodiments necessarily include exposed operating members such as spindles or chains, in which the dirt which falls off during tire mounting detrimentally affects the capability of the chucking device.

A further disadvantage of known machines which break the tire beads in mounted or demounted condition is to be found in the fact that nearly all of the forces required for breaking are transmitted onto the rim, which may cause considerable deformation, thus making the rims useless. Some of the known breaking devices are equipped with shoes having a fixed starting and end point of motion. Thus, depending on rim width and/or seat width of the tire beads, it can happen that the starting point is insufficient to press a tire bead from its seat down into the center well. On the other hand, the stroke can also be too long, so that the shoe presses against the opposite side of the drop center well, thereby not only deforming the rim but damaging the tire and tube as well. Breaking devices are known, of course, in which one shoe is moved in relation to the drop center well. However, since the other shoe has a fixed starting point of breaking motion, the aforementioned disadvantages recur.

The known demounting machines are provided with finger or shoe type tools or a rotating roll. The tires are naturally subjected to the highest strain on equipment where the rubber is passed over stationary portions. The devices equipped with a roll have the disadvantage that the front end portion of the roll travels along the inside of a bead while the substantial backing forces on the opposite and axially somewhat displaced portion of the same roll are slidingly transmitted onto the rim lip.

In order to mount tires on known devices, differently shaped levers or straps are used over which the tire beads are led when being mounted. Due to the liplike configuration of the sealing portion in case of tubeless tires and friction which occurs during the mounting procedure, damage to the tire can result. Mounting devices are known, of course, which roll in the tire by means of one or more rolls so that the tire and particularly the sealing edge are handled carefully. However, during this rolling-in operation substantial backing forces in the direction of the wheel center are produced which are transmitted onto the painted portion of the rim lip by friction caused by the faces of the rolls. This in turn will mar the paint on the rims and obstruct the movement of the tool performing the rolling-in operation; consequently, a harmful strain on the tire beads will develop. There are also known tire roll-in devices on which the radial forces are backed by the rim lip by means of an additional roll. However, it is still possible that the device may make contact in the axial direction of the rim, so that here damage to the paint is also unavoidable.

Furthermore, a tire mounting machine is known on which rims with and without center hub openings can be chucked and breaking of the tire beads accomplished while the tire is in demounting or mounting position. However, such a device presents a number of disadvantages, particularly in that damage to the tire and rim cannot be avoided, since breaking of the tire beads is effected by means of one breaking roll only and mounting and demounting by means of a tool similar to a guide shoe. Since breaking of the tire beads is on one side only, deformation of the rim may occur, and during the mounting and demounting operations the delicate sealing edges of the tire beads can be damaged as a result of the sliding friction.

According to US Letters Patent No. 3,086,578, a tire mounting and demounting apparatus is known on which the tire can be broken and rolled in or out while chucked for mounting or demounting. However, mounting of wheels having rims without center hub openings is not possible. Another disadvantage is that the breaker shoes are not brought into contact with the rim drop center well, which is the reason why damage to the tire can result when breaking. Additionally, adjustment of the breaker shoes and the adaptation to different size tires is quite time consuming and difficult.

Proceeding from this state of the art, it is the aim of the present innovation to obviate the indicated deficiencies of known devices by providing a tire mounting and demounting device on which tires of completely different rim sizes, with or without center hub openings, can be quickly and easily mounted and/or demounted without damage to tire or rim.

According to a preferred embodiment of the invention, a pair of cooperating, balanced breaker shoes are brought into contact with the rim drop center well by means of a stop abutting against the inner side of the rim. The device for locking the wheel consists of a chuck equipped with a plurality of stepped jaws. The device for rolling off the tire beads has a support roll with a concave surface for backing or dissipating the transverse forces which build up in rolling-in process on the rim lip. The device for rolling in the tire beads is preferably provided with a support roll having a notched or V-shaped surface, said support roll abutting the rim lip when rolling in and having its axis inclined toward the wheel axis. The internal parts of the chuck are protected from damage caused by dirt and so forth by a sealing plate or cover member which completely covers these parts.

Other details and characteristics of the invention can be noted from the following description of a preferred embodiment with reference to the enclosed drawings in which:

FIGURE 1 is a perspective view of the machine and housing, with the breaker shoes in the inoperative position;

FIGURE 6 is a longitudinal section of the rolling-off device for demounting a tire; and FIGURE 7 is a longitudinal section of the rolling-in device for mounting a tire.

DETAILED DESCRIPTION OF THE INVENTION

Figure 4:
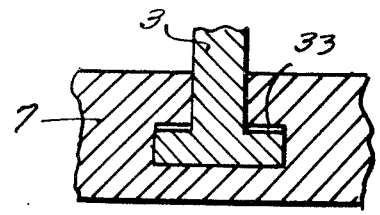
FIGURE 4 is a sectional view taken along line A-A of FIGURE 3 showing one of the blocks slidably received within a dovetail groove in the chuck base.
Figure 3:
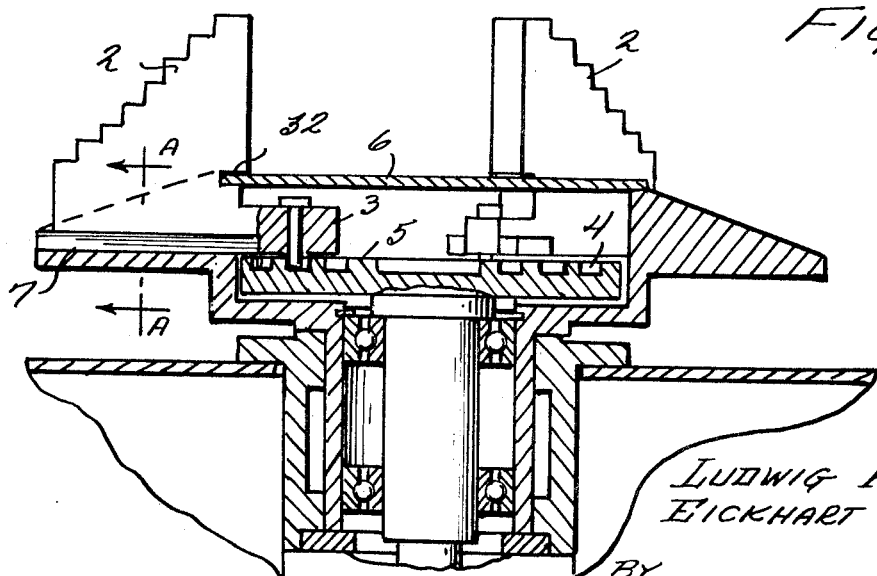
FIGURE 3 is a cross-sectional view of the stepped chuck, the apparatus which drives it, and the cover member which seals the driving apparatus.
Figure 5:
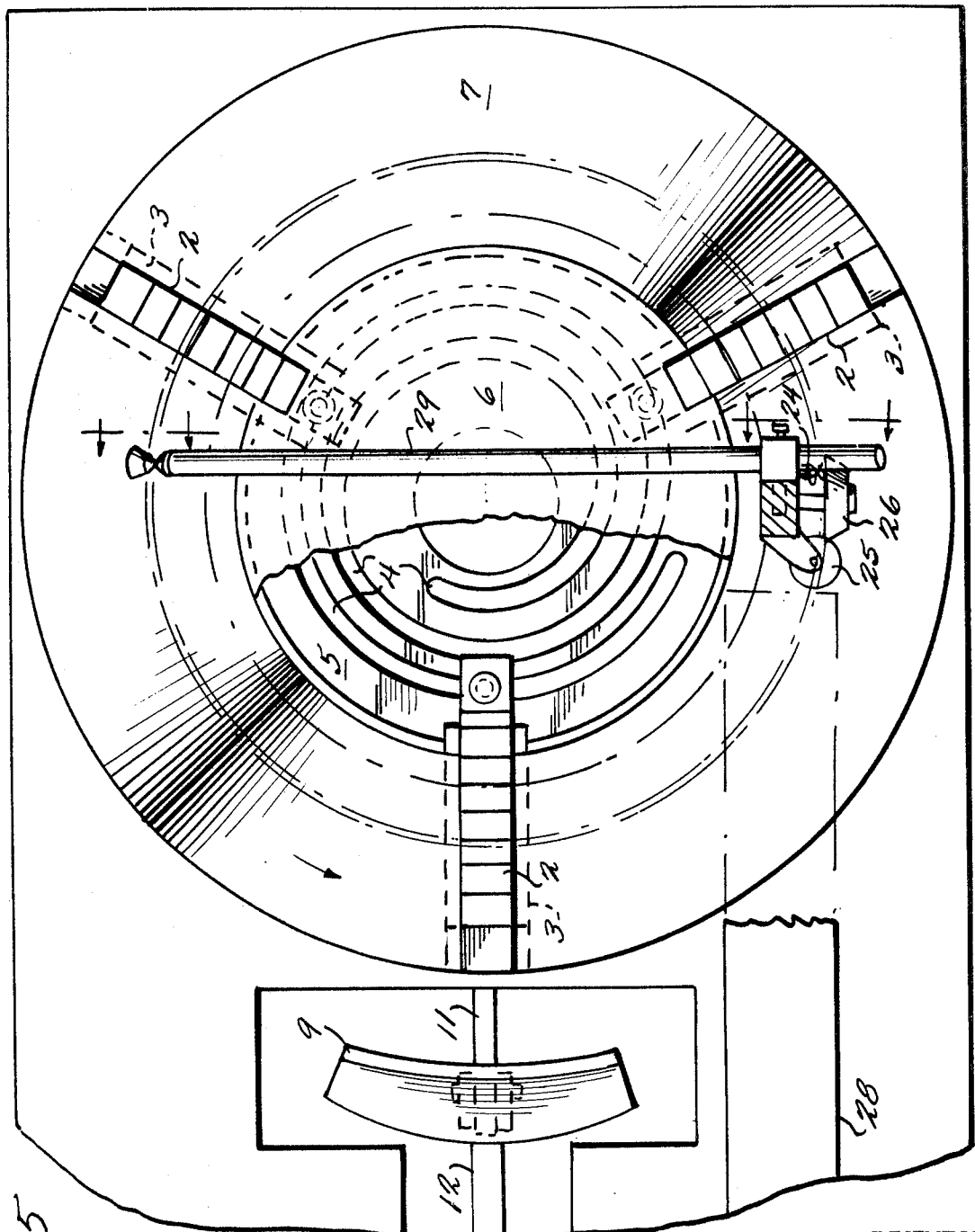
FIGURE 5 is a top plan view of the chuck, the mounting and demounting tools, and the lower breaker shoe in the inoperative position within the machine frame housing.

Referring to the drawings, a frame type machine housing 1 has arranged therein a chucking device which is provided with three chucking jaws 2 which are rotatable in a horizontal plane. The chucking jaws 2 are provided with several steps so that rims of varying diameter can be locked thereon. Chucking jaws 2 are mounted on sliding blocks 3, so that the jaws can move radially outward to lock rims of varying diameter. As shown in FIGURES 3 and 4, slidable block 3 is engaged in driven relationship with spirally grooved disc 5 by means of a pin (see FIGURE 3) which is received in one of the spiral grooves 4 of disc 5. Disc 5 is driven by an electric motor 34. Referring to FIGURE 3 of the drawings, each of the sliding blocks 3 is received in a dovetail groove 33, thus enabling the blocks 3 with the jaws 2 mounted thereon to move radially outwardly while the chuck base 7 remains stationary. However, once the jaws have locked the tire rim, the blocks are prevented from further sliding; due to the grooved engagement between the blocks and the chuck base 7, the base 7 now begins to rotate with the remainder of the chucking device. Albeit the dovetail groove arrangement is preferred, any equivalent construction which initially allows the jaws to move relative to the base, and subsequently enables the jaws 2 and base 7 to rotate in unison, may be employed. Depending on the motor's direction of rotation, the jaws will slide inwardly or outwardly to lock or unlock the tire rim.

Figure 2:
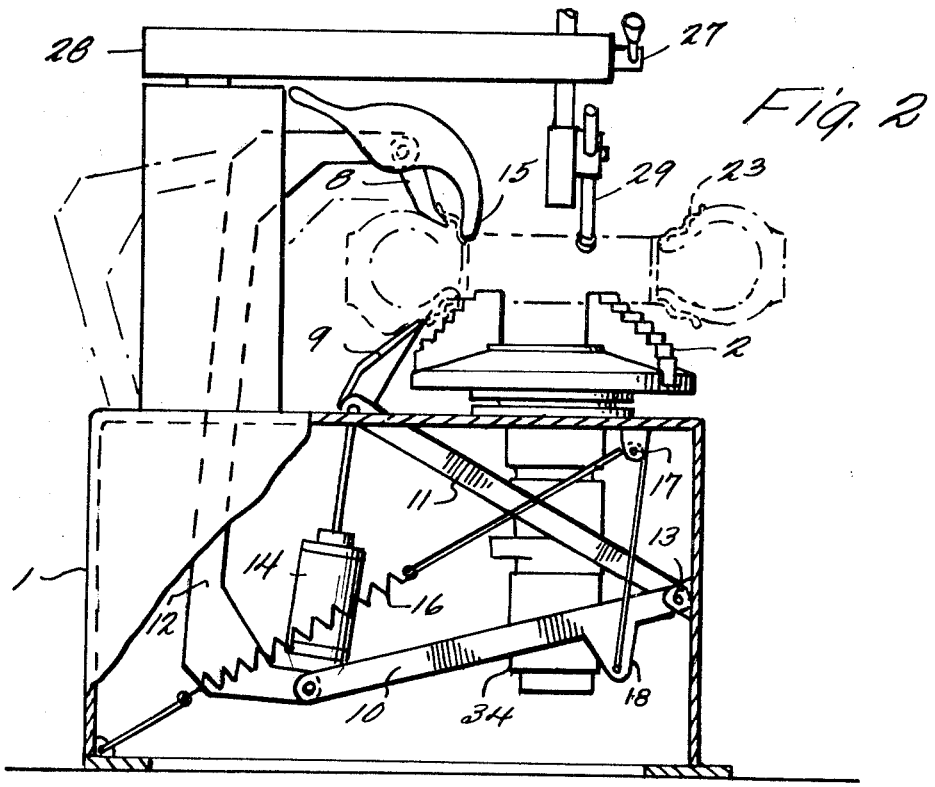
FIGURE 2 depicts the machine as viewed from the rear, with the frame housing shown in section and the breaker shoes in the operative position.

Due to the offsets of chucking jaws 2, rims of widely varying diameter can be mounted as shown in FIGURE 2. Dispensing with any previous setting, locking requires, therefore, only a path of a few millimeters which is invariable for all rim sizes from 10–18″ in any event the path is necessarily shorter than one step width. The steps of the chucking jaws will be suitably adapted for the various common rim diameters.

The internal portions of the chucking device, that is the blocks 3, disc 5, and motor 34, are sealed or enclosed by a disc-like plate or cover member 6, which is received in a groove-like recess 32 in the chucking jaws 2. The purpose of cover member 6 is to preclude dirt and other foreign matter from settling on the internal parts of the chuck and impairing the operation thereof.

As can be seen from FIGURE 2, the breaking device is provided with a pair of cooperating upper and lower breaker shoes 8 and 9, respectively. The two breaker shoes 8 and 9 are connected to main levers 10 and 11, the breaker shoe 8 being hinged to the main lever 10 via a draw rod 12 while the breaker shoe 9 is directly united by a joint with the main lever 11. The two main levers 10 and 11 have a common fulcrum or bearing 13 on the machine housing 1. The two ends of main levers 10 and 11 opposite the fulcrum 13 are articulated to, operatively connected with, each other by means of a piston-cylinder arrangement 14. On the upper end of draw rod 12 a stop 15 is provided which can be positioned against the rim's inside within the drop center well area.

The floatingly-mounted breaking device is balanced by a counterweight which, as shown in FIGURE 2, can be a tension spring 16 which is led over a pulley 17 and engages main lever 10 at 18. The point of engagement 18 has so been selected that the lever arm of the point of engagement will increase to the same extent as the pull of the spring decreases so that the operation will always be constant and thus the shoes are always in a balanced, suspended condition.

Due to the stop 15 which abuts against the rim's inside within the drop center well, the breaking device can be moved into close relation to the rim drop center well for all rim sizes. This is very advantageous for breaking the tire beads. Breaking of the tire beads is accomplished by simultaneous operation of the two breaker shoes 8 and 9 which are actuated by the piston cylinder arrangement 14. Usually, the piston cylinder arrangement 14 is pneumatically actuated, spreading apart the two main levers 10 and 11. As a result of the floating mounting of the two main levers 10 and 11 and of the simultaneous operation of the breaker shoes 8 and 9, the tire will be broken without damage to tire or rim and without excess transverse forces acting on the rim, thus precluding distortion of the rim.

Arm 28 which carries the mounting and demounting tool, is pivotally connected to the housing 1. The height of the mounting and demounting tool is vertically adjustable by means of the clamping lever 27.

The rolling-off device or tool 29 for demounting a tire, as shown in FIGURE 6 of the drawing, is of a generally known lever-like design. Rolling-off tool 29 is slidably or movably held in block member 36 in such a manner that it can be readily manipulated, or removed if desired. On the front end of the rolling device are rotatably arranged two hardened rollers 20 and 21, which are mounted on a common axis rod 19. The front cone-shaped roller 21 serves to roll the tire bead 22 off. The second roller 20, which has a concave surface, backs the transverse forces which build up in rolling off the tire bead 22 on the rim lip while rotating in a direction opposite to that of roll 21.

The concave configuration of roll 20 prevents an axial and radial deviation of the device and thus ensures a rolling-off and backing in the desired manner. Hence, very careful handling of the sealing edge of the tire bead 22 is achieved and simultaneously any marring of the paint on the rim lip 23 avoided.

Similarly, the rolling device for mounting a tire, as shown in FIGURE 7, is also equipped with a notched roll 24 which travels on the rim lip 23. The rolling device for mounting, as shown, is provided with a wide roll 25 which at both its ends is heavily flange-shaped and provides sufficient space when rolling in both tire beads simultaneously. A third roller 26 having a trapezoidal cross-section as shown in FIGURE 7 is used for rolling in bead 22. Due to the additional roll 25 arranged according to the invention, the radial and axial forces of the rolling-in operation are rotatably backed on the rim lip 23 so that the rim will not be damaged and unnecessary strain to the tire avoided.

In summary, a tire mounting and demounting machine according to the invention has the following advantages:

Tires on rims with or without center hub openings can be broken in mounting or demounting position. Rims of varying diameter can be locked without changing the chucking elements. Chucking time and chucking path are very short. Pressing of the tire into the drop center well is effected simultaneously at two opposite sides without having transverse forces act on the rim. Due to its balanced condition, the breaking device can be operated very easily, and because of a stop abutting against the inner side of the rim within the drop center well area it is ensured that the tire beads are pressed into the rim drop center well without damage regardless of the seat width. When rolling the tire off or in, the rotatable backing of forces will avoid any damage to tire and rim. The wheel to be demounted is clamped on the step chuck 2 of the machine. The bead breaker is swung over to the left-hand side (FIG. 2) and thereafter the breaker will then be brought into working position as shown in FIG. 2. The stop 15 is then inserted into the inner rim well so as to abut against the outer side of the drop center well. The upper breaker shoe 8 now rests on the upper side wall of the tire. The lower breaker shoe at this point does not rest on the lower side wall of the tire. On actuation of the cylinder 14 the breaker shoes 8 and 9 approach each other. The breaker shoe 9 moves upwardly until it abuts against the upper side wall of the tire. Thereupon, the breaker shoe 8 presses the tire bead into the drop center well of the rim. This downward movement is limited by the stop 15 which abuts against the drop center well of the rim ring. Consequently, the stop 15 accomplishes two objects: first, it ensures that the tire bead is in fact broken into the drop center well and, secondly, the stop 15 limits the downward movement of upper breaker shoe 8 to such extent that the lower breaker shoe 9 can also press the lower tire bead into the drop center well because as soon as the breaker shoe 8 has reached its stop, the breaker shoe 9 will continue to move from below and also press the lower bead of the tire into the drop center well. At this moment the tire has been broken.

Important in this connection is the operation of spring 16. This spring, together with the rope attached thereto, which is suspended on the guide pulley 17 and fastened to the lever 10 at point 18, effects a relief of the whole breaking device. This arrangement in conjunction with the pivoting of the whole breaking system in point 13 accomplishes two objects: first, the breaking device automatically adjusts to different tire and rim widths, in other words, the drop center well of the rim is the point of reference and, secondly, no forces whatever are transmitted to the adaptor of a wheel thus ensuring that the rim undergoes no permanent deformations.

After the breaking, the demounting of the tire can be undertaken. To effect this the upper tire bead is lifted by means of the tire iron 29 which will then be fixed to the arm 28. Thereupon the motor 34 (FIG. 2) rotates the tire thereby lifting the bead out of the rim. A similar operation is effected with the lower bead, which is also lifted up beyond the upper rim flange.

The tire is mounted by means of the vertically adjustable rolls 24, 25, and 26 which are secured to the swivel arm 28. Said arm 28 is brought in such a position that the roller 24 (FIG. 7) just touches the rim flange 23 as shown in FIG. 7. The bead of the tire is placed between the two shoulders of the roll 25 in such a way that the zone adjacent to the tire bead will be below the roll 26. While the tire is rotated by the motor 34, the bead of the tire is rolled into the rim flange.

Although the tire mounting and demounting machine has been described with reference to a particular embodiment, it will become apparent to those skilled in the art that variations can be made in the invention. All such variations as would be obvious to those skilled in this art are intended to be included within the scope of this invention.

We claim:
1. In a tire mounting and demounting machine:
   a housing;
   tire locking means secured in said housing;
   power actuated breaker shoe means pivotally connected to said housing for the purpose of disengaging tire heads from a rim;
   counterweight means connected to said breaker shoe means and being secured to said housing in such a manner that said breaker shoe means is constantly maintained in a balanced, suspended condition;
   stop means operatively connected to said breaker shoe means, said stop means capable of being operatively positioned against the inside of the rim in order to ensure that said breaker shoe means will effectively disengage said tire tread from said rim;
   a rolling-off tool means operatively connected to said housing in order to roll off the bead of a tire during demounting, said rolling off the bead of a tire during demounting, said rolling offtool means including:
      a first roller for rolling the tire bead off, and
      a second roller rotatably arranged on a common axis with said first roller, said second roller having a concave surface which contacts the lip of the rim of the tire to back the transverse forces on the rim in a rolling manner; and
   a rolling-in tool means operatively connected to said housing so that said tire head may be rolled in during mounting.

2. A chuck for use with a tire mounting and demounting machine comprising:
   a plurality of step-like chucking jaw means for accepting rims of varying diameter;
   slidable block means connected to each of said chucking jaw means, so that said jaw means may be moved radially in order to engage and disengage said rims;
   said slidable block means being engaged with a spirally grooved disc;
   said spirally grooved disc being in driven relationship with a driving means, so that upon actuation of said driving means, said chucking jaw means will be driven into locking relationship with said rim.

3. In a tire mounting and demounting machine:
   a housing;
   tire locking means secured in said housing;
   power actuated breaker shoe means pivotally connected to said housing for the purpose of disengaging tire heads from a rim;
   counterweight means connected to said breaker shoe means and being secured to said housing in such a manner that said breaker shoe means is constantly maintained in a balanced, suspended condition;
   stop means operatively connected to said breaker shoe means, said stop means capable of being operatively positioned against the inside of the rim in order to ensure that said breaker shoe means will effectively disengage said tire tread from said rim;
   a rolling-off tool means operatively connected to said housing in order to roll off the bead of a tire during demounting; and
   a rolling-in tool means operatively connected to said housing so that said tire bead may be rolled in during mounting, said rolling-in tool means including:
      a V-shaped roller which contacts the lip of the rim of the tire in such a manner that forces acting on the rim are precluded from damaging said rim.